(12) United States Patent
Ali et al.

(10) Patent No.: US 12,246,800 B2
(45) Date of Patent: Mar. 11, 2025

(54) RELEASABLE FLOAT ASSEMBLY AND METHOD OF OPERATING

(71) Applicant: Jackson State University, Jackson, MS (US)

(72) Inventors: Kamal S. Ali, Jackson, MS (US); Ali Abu-El Humos, Brandon, MS (US); James C. Addy, Terry, MS (US); Michael P. Cameron, Brandon, MS (US); Md Mohiuddin Hasan, Jackson, MS (US)

(73) Assignee: Jackson State University, Jackson, MS (US)

( * ) Notice: Subject to any disclaimer, the term of this patent is extended or adjusted under 35 U.S.C. 154(b) by 515 days.

(21) Appl. No.: 17/354,755

(22) Filed: Jun. 22, 2021

(65) Prior Publication Data

US 2022/0402578 A1    Dec. 22, 2022

(51) Int. Cl.
| | | |
|---|---|---|
| *B63B 22/06* | (2006.01) | |
| *G05B 19/042* | (2006.01) | |
| *G05B 19/08* | (2006.01) | |
| *H01F 7/02* | (2006.01) | |
| *H01F 7/06* | (2006.01) | |

(52) U.S. Cl.
CPC .......... *B63B 22/06* (2013.01); *G05B 19/0426* (2013.01); *G05B 19/08* (2013.01); *H01F 7/0231* (2013.01); *H01F 7/064* (2013.01); *G05B 2219/23193* (2013.01); *G05B 2219/23304* (2013.01); *G05B 2219/24067* (2013.01); *G05B 2219/25278* (2013.01)

(58) Field of Classification Search
CPC ......... B63B 22/00; B63B 22/04; B63B 22/06; B63B 22/08; H01F 7/064; H01F 7/0231; H01F 2007/208; G05B 19/0426; G05B 19/08; G05B 2219/23193; G05B 2219/23304; G05B 2219/24067; G05B 2219/25278; A01K 69/06; A01K 69/08
USPC .................................................. 441/1, 2, 6, 7
See application file for complete search history.

(56) References Cited

U.S. PATENT DOCUMENTS

| | | |
|---|---|---|
| 2,239,911 A | 4/1941 | Dorn |
| 2,433,189 A | 12/1947 | Amato |
| (Continued) | | |

OTHER PUBLICATIONS

Department of Defense, Navy, "Jellyfish-Mimicking Profiling Float," STTR, Creare LLC, Contract No. N68335-18-C-0369, 2018. Webpage, https://www.sbir.gov/sbirsearch/detail/1516373.

(Continued)

*Primary Examiner* — Daniel V Venne
(74) *Attorney, Agent, or Firm* — Butler Snow LLP; Jon E. Holland

(57) ABSTRACT

A magnetic release assembly includes a housing defining a cavity, a permanent electromagnet positioned within the cavity, and a microcontroller electronically coupled with the permanent electromagnet. The microcontroller is configured to selectively provide power to the permanent electromagnet. A timer board is in communication with the microcontroller. A power source is electronically coupled with the microcontroller, the permanent electromagnet, and the timer board. The microcontroller is configured to provide power to the permanent electromagnet in response to an alarm from the timer board.

9 Claims, 17 Drawing Sheets

(56) References Cited

U.S. PATENT DOCUMENTS

| | | | |
|---|---|---|---|
| 4,262,379 A * | 4/1981 | Jankiewicz | A01K 69/08 441/2 |
| 5,100,353 A | 3/1992 | Dombrowski et al. | |
| 6,261,142 B1 * | 7/2001 | Fiotakis | B63B 22/02 441/2 |
| 6,292,436 B1 | 9/2001 | Rau et al. | |
| 6,739,924 B1 * | 5/2004 | Groen | A01K 69/06 441/2 |
| 7,187,623 B2 | 3/2007 | Green et al. | |
| 7,534,152 B1 * | 5/2009 | Lloyd | A01K 69/06 441/2 |
| 7,743,597 B2 | 6/2010 | Shnayder | |
| 8,047,590 B1 | 11/2011 | Hamme | |
| 8,448,592 B2 | 5/2013 | Crowell et al. | |
| 9,126,662 B2 | 9/2015 | Preradovic et al. | |
| 9,488,038 B2 | 11/2016 | De Ghetto et al. | |
| 10,518,848 B2 | 12/2019 | Sinclair et al. | |
| 2015/0301206 A1 | 10/2015 | Shimizu et al. | |
| 2019/0137847 A1 | 5/2019 | Mallette | |

OTHER PUBLICATIONS

Department of Defense, Navy, "Sea-Log A Sustainably Energized, Adaptive, Littoral Ocean Grid," SBIR, Planning Systems, Inc., Contract No. N051-076-0925, 2005. Webpage, https://www.sbir.gov/node/276848.

* cited by examiner

RELEASABLE FLOAT ASSEMBLY AND METHOD OF OPERATING

RESEARCH OR DEVELOPMENT

This invention was made with government support under grant 8 RCEGR470004-01-04 (subaward 8006490-01-01 JSU) awarded by the U.S. Department of Treasury/Mississippi Department of Environmental Quality. The government has certain rights in the invention.

FIELD

The present subject matter generally relates to a releasable float assembly, specifically an underwater magnetically releasable float assembly.

BACKGROUND

When trap fisherman, scientists, or other entities utilizing submersible objects place these objects underwater, a float or other buoyant member is often used to mark the location of the submerged object. These floats may be tethered to the object and may be tangled or damaged by watercraft and may increase the risk of vandalism or theft of the submerged objects whose locations are consistently viewable.

BRIEF SUMMARY OF THE DISCLOSURE

According to some aspects of the present disclosure, a magnetic release assembly includes a housing defining a cavity. A permanent electromagnet is positioned within the cavity. A microcontroller is electronically coupled with the permanent electromagnet and is configured to selectively provide power to the permanent electromagnet. A timer board is in communication with the microcontroller. A power source is electronically coupled with the microcontroller, the permanent electromagnet, and the timer board. The microcontroller is configured to provide power to the permanent electromagnet in response to an alarm from the timer board.

According to some aspects of the present disclosure, a releasable float assembly includes an apparatus coupled with a float. The float is configured to be buoyant. A magnetic release assembly is coupled with the apparatus. The magnetic release assembly includes a permanent electromagnet configured to be selective engaged with the float, a microcontroller operably coupled with the permanent electromagnet, a timer board in communication with the microcontroller, and a power source configured to selectively power the microcontroller, the timer board, and the permanent electromagnet.

According to some aspects of the present disclosure, a method of programming a releasable float assembly includes steps of downloading an application to a user device, selecting a button to set up a new UMR device, and searching for a UMR device. The method may further include steps of entering a release date and time and selecting a launch button to save information regarding a selected UMR device.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
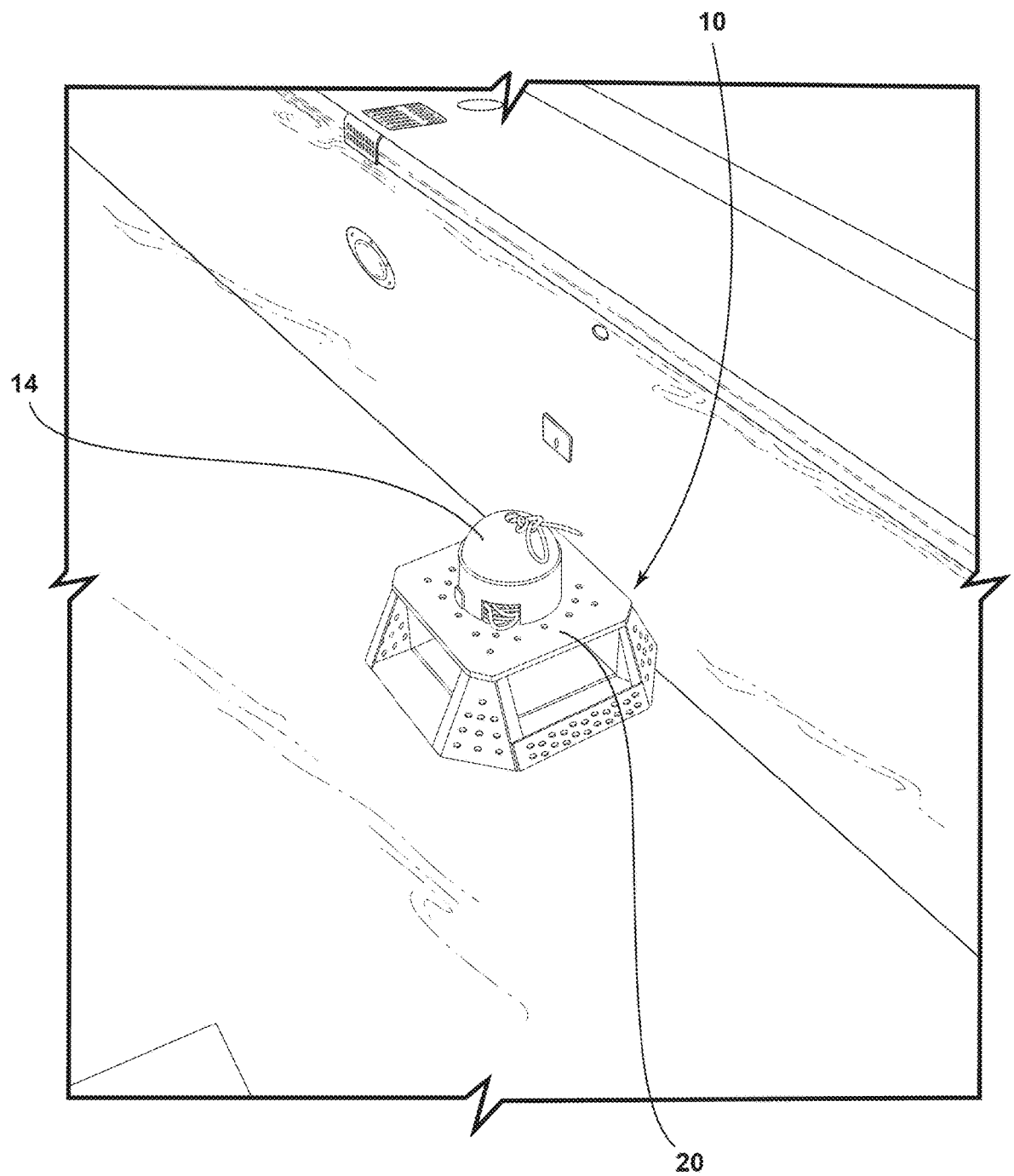
FIG. 1 is a top perspective view of a releasable float assembly coupled with an apparatus and positioned underwater with a float in a first position, according to various examples.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to a releasable float assembly 10 including a magnetic release assembly 12 operably coupled with a float 14. The magnetic release assembly 12 is configured to be programmed to release the float 14 at a future point in time (e.g., after a minute, after an hour, or after multiple months). A smart device application is configured to program a release time prior to placing the releasable float assembly 10.

Figure 2:
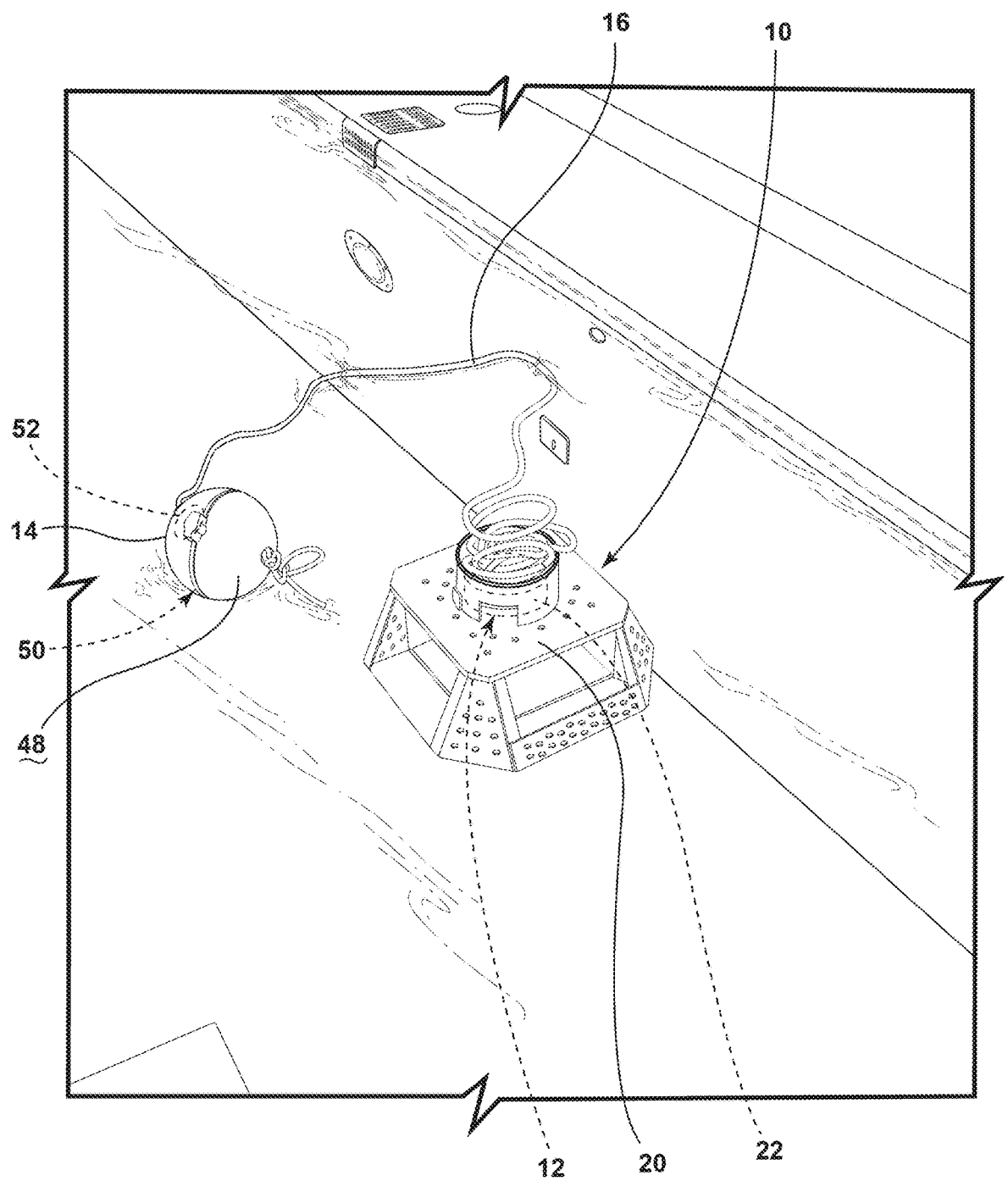
FIG. 2 is a top perspective view of the releasable float assembly of FIG. 1 with the float in a second position.

Referring now to FIGS. 1 and 2, an apparatus 20 of the releasable float assembly 10 is configured to be submerged in water. The apparatus 20 may be any object including, but not limited to, for example, a box, a cage, a trap, etc. It will be understood that the apparatus 20 illustrated herein is exemplary only and may be replaced with any other object without departing from the scope of the present disclosure. It will also be understood that, while the releasable float assembly 10 is described herein as an underwater releasable float assembly 10, it is configured to be operable in any environment, including out of water.

Figure 3:
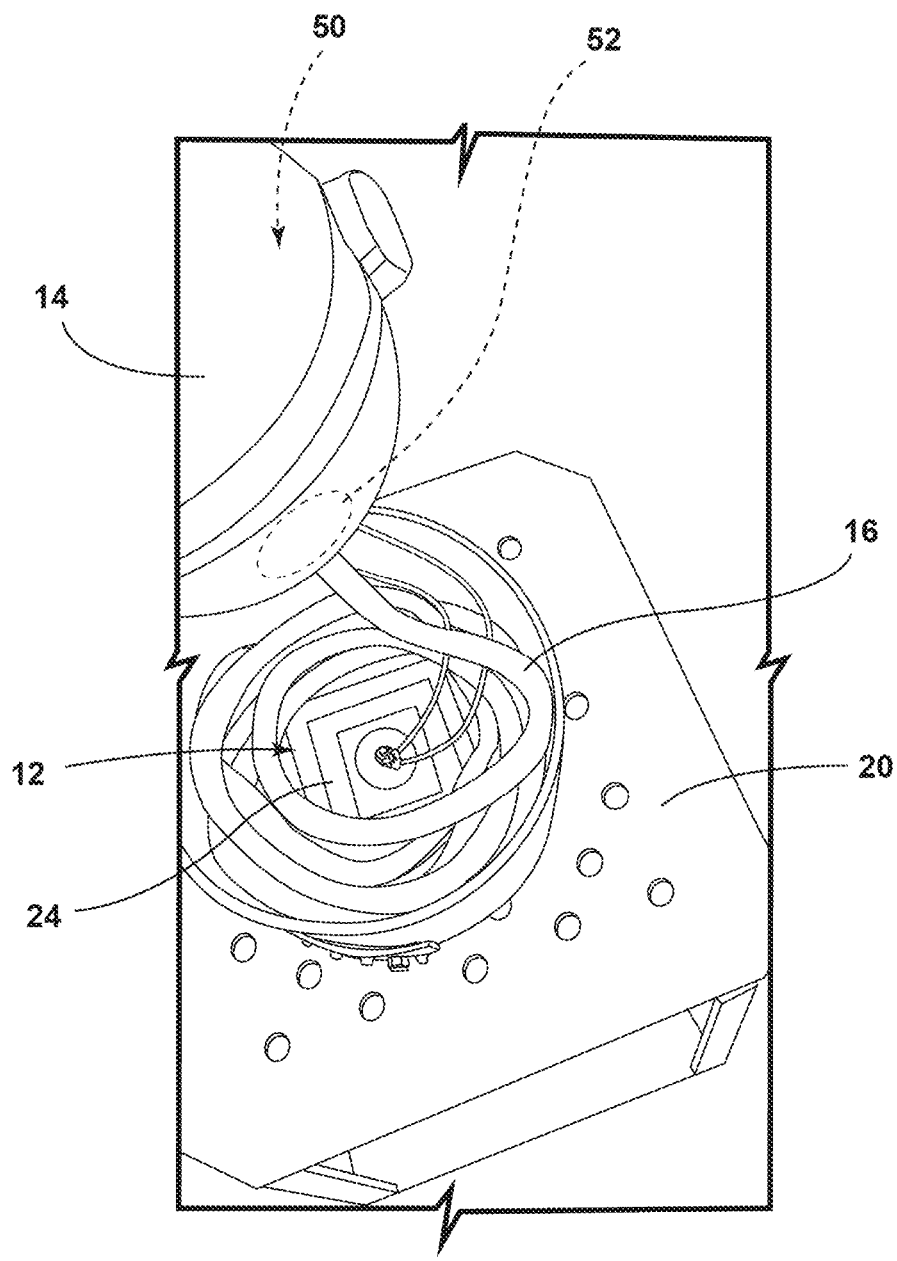
FIG. 3 is a top perspective view of the releasable float assembly of FIG. 1 with a float separated from a magnetic release assembly, according to various examples.
Figure 4:
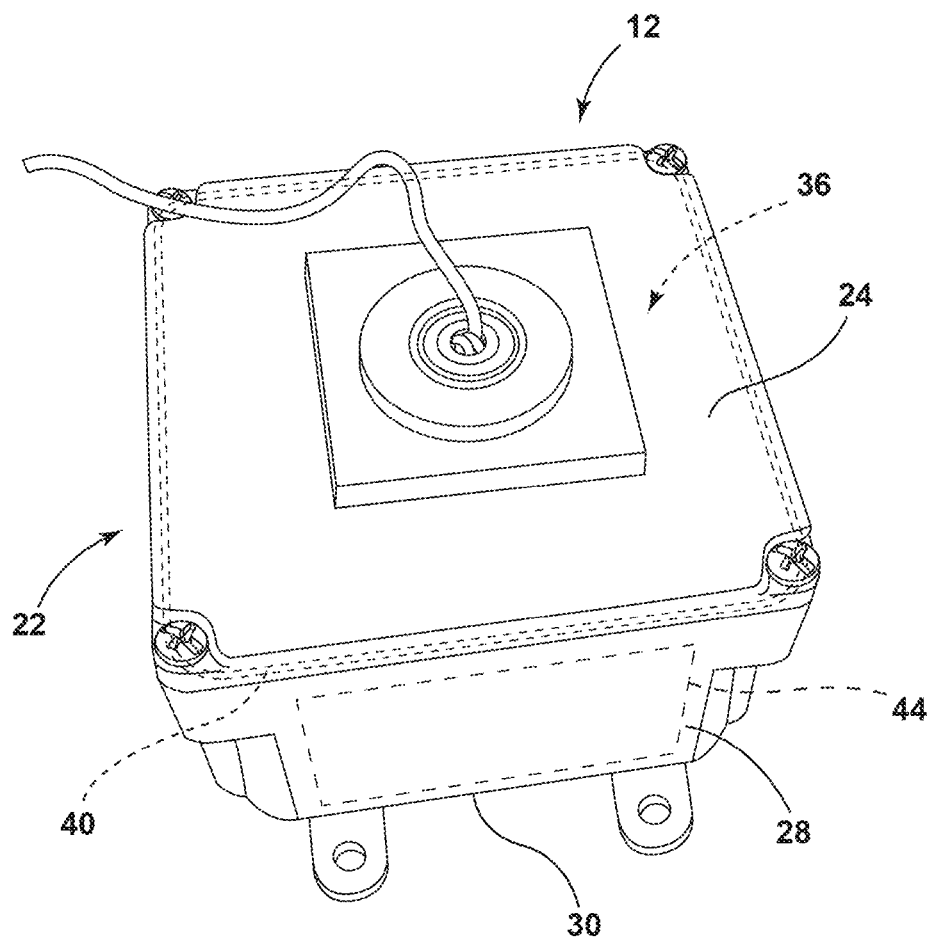
FIG. 4 is a side perspective view of the magnetic release assembly of FIG. 3.

Referring now to FIGS. 1-4, the magnetic release assembly 12 is coupled with the apparatus 20 and is configured to be magnetically engaged with the float 14. The magnetic release assembly 12 includes a housing 22 and may include a cover 24 configured to be selectively coupled with the housing 22. In some examples, the housing 22 may include a perimeter wall 28 and/or a bottom wall 32 at least partially defining a cavity 36 therein. The cover 24 may be configured to form a top wall of the housing 22. The housing 22 may have any shape including, for example, a square, a rectangle, a circle, etc. As best shown in FIG. 4, when the cover 24 is coupled with the housing 22 to selectively seal the cavity 36, an O-ring 40 may be positioned between the housing 22 and the cover 24. The O-ring 40 is configured to seal the cavity 36 defined therein when the cover 24 is coupled with the housing 22. In various examples, a material may be positioned to fill the cavity 36. For example, the material may be a mineral oil configured to minimize the pressure differential for deeper deployments of the magnetic release assembly 12.

As best shown in FIGS. 3 and 4, the magnetic release assembly 12 includes electrical components 44 positioned within the cavity 36 of the housing 22. The electrical components 44 include at least a permanent electro-magnet (PEM) 48. In various examples, the PEM 48 may be positioned proximate the cover 24 of the housing 22. In other examples, the PEM 48 may be coupled with the cover 24 of the housing 22. It is contemplated that the PEM 48 may be positioned on any portion of the housing 22 without departing from the scope of the present disclosure. The PEM 48 may further be configured with a holding power of about 40 pounds. It will be understood that the PEM 48 may also have any other holding power compatible with the magnetic release assembly 12 without departing from the scope of the present disclosure.

Referring again to FIGS. 2 and 3, the float 14 of the releasable float assembly 10 may be configured to be buoyant. For example, the float 14 may be comprised of buoyant materials, may be a hollow sphere, or may be any combination thereof. A metal disk 52 is coupled with the float 14. In various examples, the metal disk 52 may be positioned on an exterior surface 48 of the float 14. In other examples, the metal disk 52 may be positioned within a cavity 50 defined by the float 14.

The PEM 48 is configured to selectively engage with the metal disk 52 to place the magnetic release assembly 12 in a locked state (see FIG. 1). The metal disk 52 may be formed of any magnetic material configured to be attracted to and selectively engaged with the PEM 48. When the PEM 48 is disengaged from the metal disk 52, the magnetic release assembly 12 is in a released state (see FIG. 2).

Figure 5:
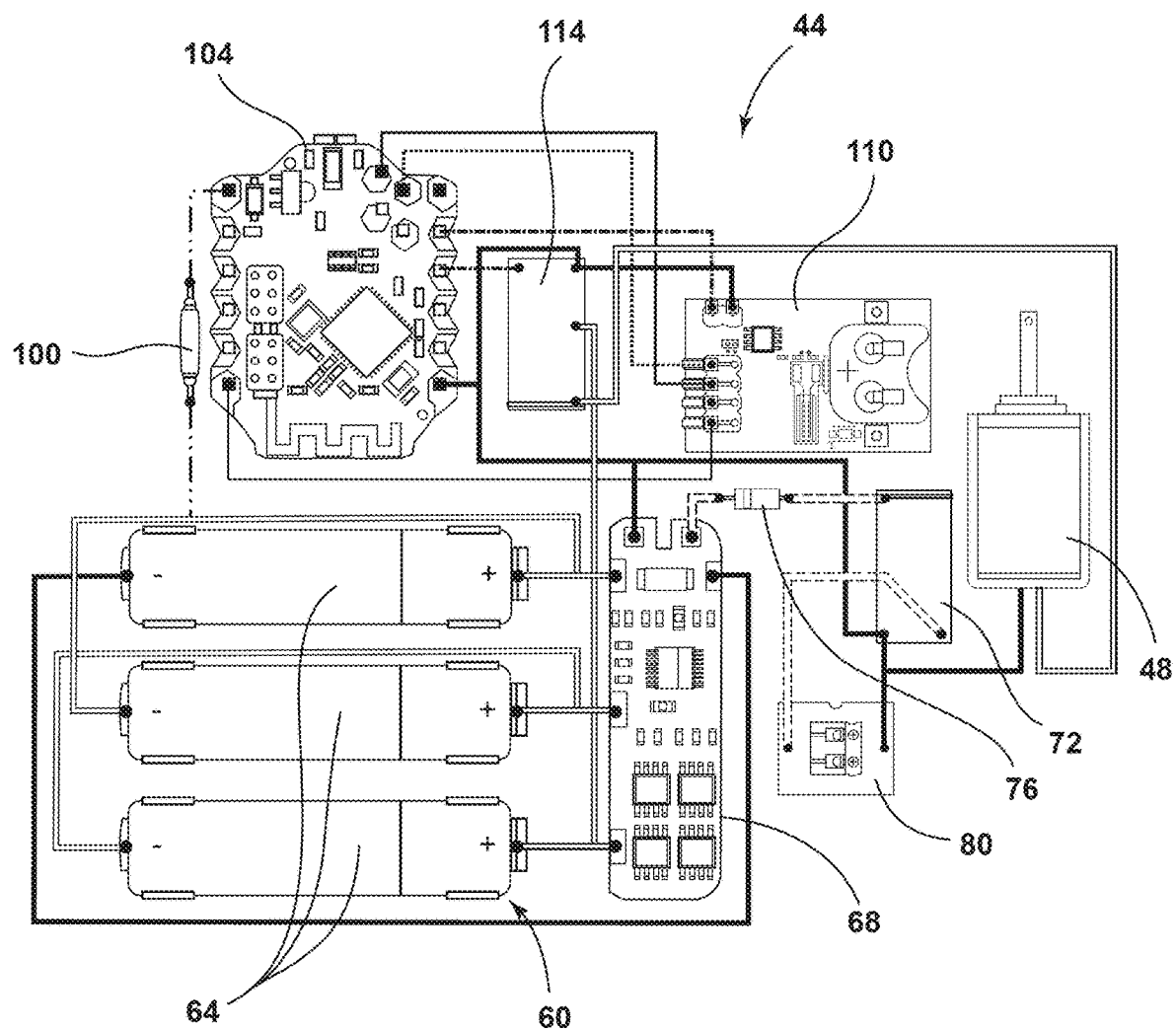
FIG. 5 is a schematic diagram of a magnetic release assembly, according to various examples.
Figure 6:
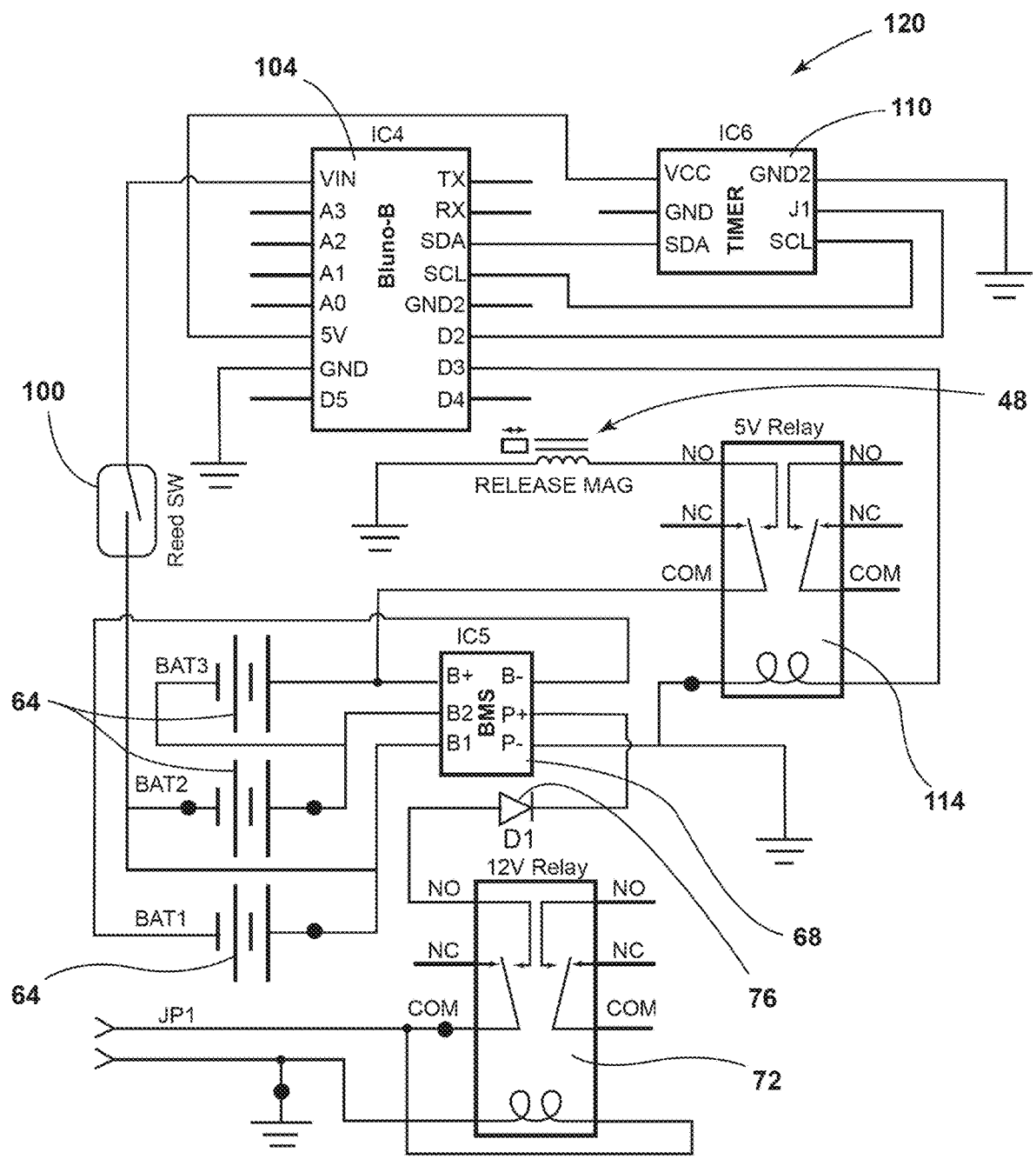
FIG. 6 is a schematic diagram of circuitry of the magnetic release assembly of FIG. 5.

Referring now to FIGS. 5 and 6, the electrical components 44 are illustrated in a first exemplary configuration. The magnetic release assembly 12 includes at least one power source 60. The power source 60 may be configured to power the magnetic release assembly 12 for about two years. However, the power source 60 may be adjusted for other lengths of time, including short lengths of time and longer lengths of time without departing from the scope of the present disclosure.

The power source 60 is positioned within the housing 22 of the magnetic release assembly 12. As illustrated, the power source 60 may be configured to include one or more rechargeable batteries 64. For example, the power source 60 may include three batteries 64. Each battery 64 may be a 18650 battery or may be any similar battery configured to be selectively recharged and capable of providing power to the magnetic release assembly 12. In various examples, the power source 60 may further include a battery charging board 68, a first relay 72, and a diode 76. The battery charging board 68, the first relay 72, and the diode 76 are configured to allow the batteries 64 to be charged without removing the cover 24 of the housing 22. As illustrated, the charging board 68 may be a lithium ion charger such as a 3S 12V 10A 18650 BMS Charger. However, it is contemplated that any charging board 68 may be used without departing from the scope of the present disclosure.

The first relay 72 is configured to couple the batteries 64, the charging board 68, and any other components of the power source 60 with the outside of the housing 22. For example, the power source 60 may also include charging poles 80 connected with the battery charging board 68. The charging poles 80 may be positioned to extend exterior of the housing 22. The first relay 72 and the diode 76 may be configured to create a charging circuit within the power source 60. The charging circuit may be configured as an open circuit while no outside charging current is provided to the charging poles 80. The first relay 72 and the diode 76 allow the charging poles 80 to be isolated from the rest of the electrical components 44 when the housing 22 is submerged. In other words, the charging poles 80 are protected from power feed-back while the magnetic release assembly 10 is submerged by the first relay 72 and the diode 76.

Figure 7:
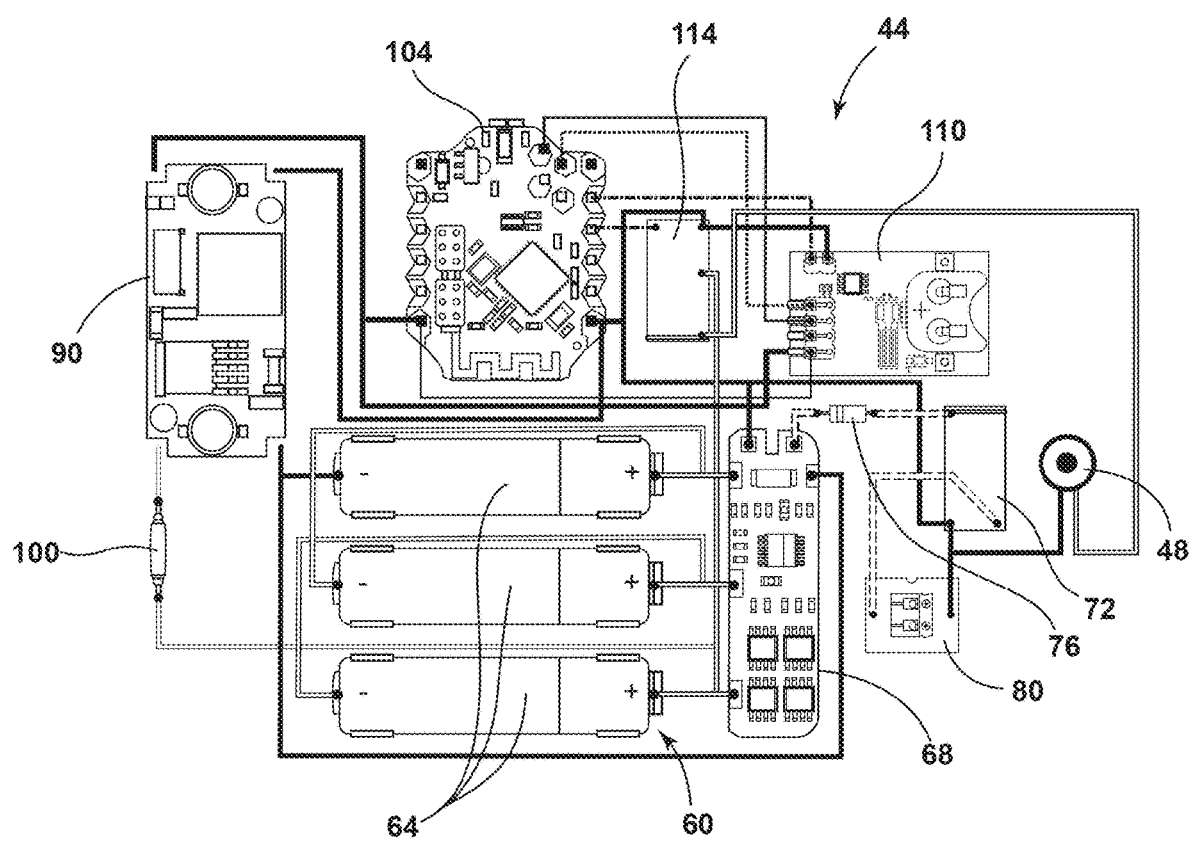
FIG. 7 is a schematic diagram of a magnetic release assembly, according to various examples.
Figure 8:
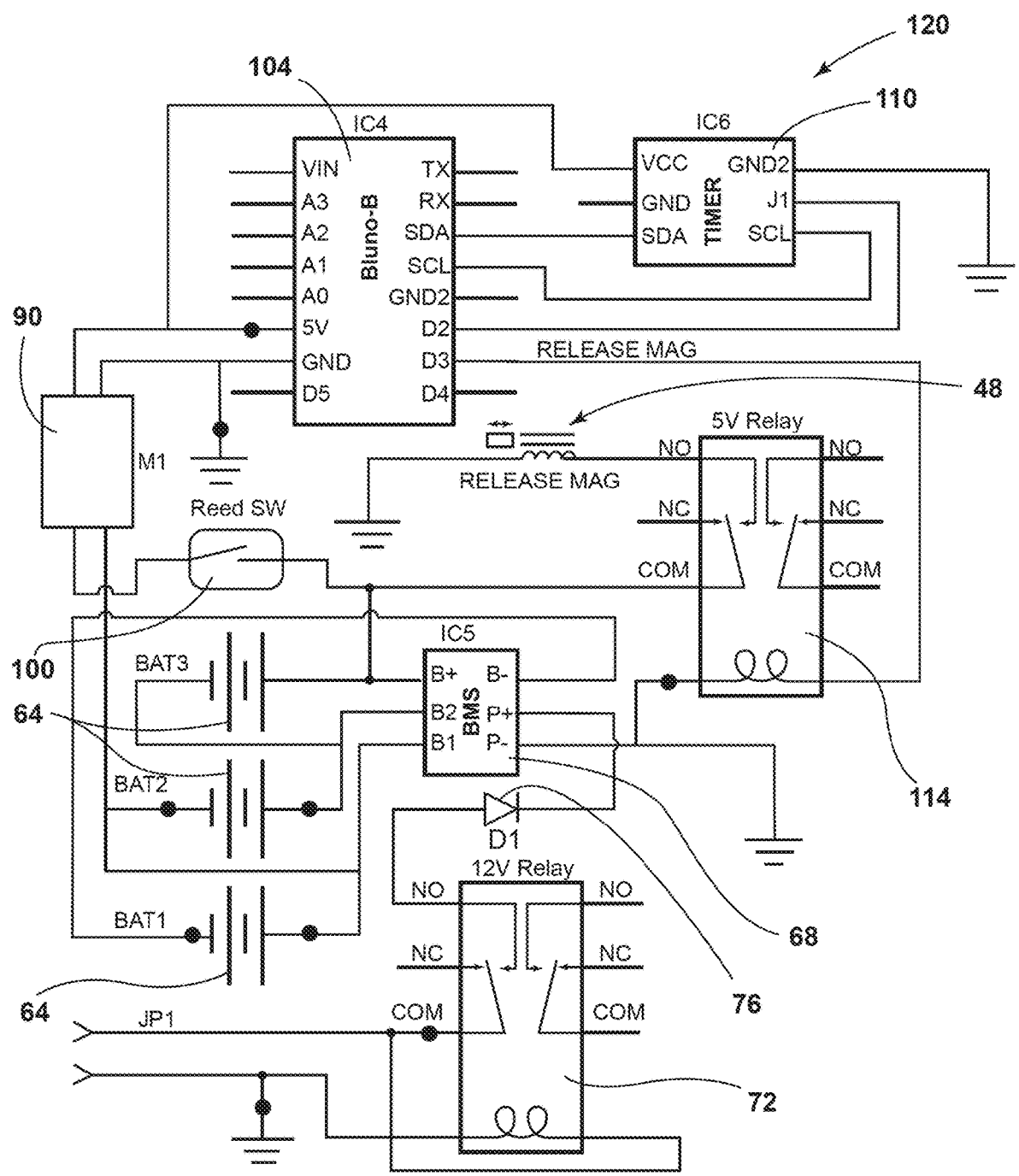
FIG. 8 is a schematic diagram of circuitry of the magnetic release assembly of FIG. 7.

Referring now to FIGS. 7 and 8, a second exemplary configuration of the electrical components 44 of the magnetic release assembly 12 is illustrated. The second exemplary configuration may include the same or similar components as the first exemplary configuration of FIGS. 5 and 6. Where the components are the same or similar, the same reference numerals have been used.

As best shown in FIGS. 7 and 8, the electrical components 44 of the magnetic release assembly 12 may further include a converter 90. In various examples, the converter 90 may be a buck converter (12V to 5V). Specifically, as exemplarily shown, the converter 90 may be a DC-DC converter such as an MP1584EN converter. The converter 90 may be configured to ensure that the power source 60 evenly powers the electrical components 44 of the magnetic release assembly 12. In other examples, the magnetic release assembly 12 may not include the converter 90 (see FIGS. 5 and 6).

Referring again to FIGS. 5-8, the magnetic release assembly 12 may further include a reed switch 100. In various examples, the reed switch 100 may positioned proximate a portion of the perimeter wall 28 of the housing 22 (not shown). The reed switch 100 may be operably coupled with a microcontroller 104 and the power source 60 and is configured as a power switching system for the magnetic release assembly 12. In other words, the reed switch 100 is configured to provide a method for resetting the magnetic release assembly 12 by opening the circuit formed by the electrical components 44. In a neutral state, the reed switch 100 is closed, closing the circuit of the electrical components 44 and allowing power to flow. When a magnet (not shown) is placed on the housing 22 proximate the reed switch 100, the reed switch 100 is moved to an open state, which opens the circuit formed by the electrical components 44 and prevents the flow of power. In various examples, indicia (not shown) may positioned on the housing 22 to allow a user to locate the reed switch 100 to switch the reed switch 100 from the neutral state to the open state. When the reed switch 100 is in the open state, the power source 60 is disconnected from the electrical components 44 to allow for system storage of the magnetic release assembly 12.

Referring now to FIGS. 5-9, the magnetic release assembly 12 may further include a timer board 110 and a second relay 114 each coupled with the microcontroller 104. The microcontroller 104 includes a Bluetooth™ integrated circuit 102 and may be configured to be in communication with an application (app) 124 located on a user device 120 when the microcontroller 104 is powered by the power source 60. For example, the microcontroller 104 may be a Bluno Beetle utilizing an ATMega328P microcontroller board and may include a CC2540 Bluetooth™ integrated circuit.

The timer board 110 is configured to receive a current time and a release time from the microcontroller 104, as discussed in more detail elsewhere herein. The timer board 110 may be a real time clock calendar. For example, the timer board 110 may be a MCP7940 timer board. The second relay 114 may be coupled with the microcontroller 104 and the PEM 48, as discussed in more detail below. Each of the first and second relays 72, 114 may be DPDT relays such as EC2-5NU or any other comparable relay. However, while specific examples of components are noted herein, it will be understood that any comparable component may be used without departing from the scope of the present disclosure.

With continued reference to FIGS. 7 and 8, all linear regulators of the microcontroller 104 may be removed, including the 3V3 and the 5V regulators. This allows the converter 90 to be directed connected with the 5V pin of the microcontroller 104. The 3V3 signal needed for the Bluetooth™ integrated circuit 102 (see FIG. 9) is received from the D5 pin of the microcontroller 104. A connection between the D5 pin and the output of the 3V3 regulator is made externally. The microcontroller 104 is then powered directly through the output of the 5V regulator output pad/pin. The device is programmed prior to making these changes.

When power is issued to the microcontroller 104, the D5 pin then powers the Bluetooth™ integrated circuit 102. This setup ensures that when the system goes into deep sleep, the Bluetooth™ integrated circuit 102 is completely powered down. When put to sleep, the microcontroller 104 and the Bluetooth™ integrated circuit 102 may be configured to consume about 4.6 uA. The timer board 110 may be configured to consumer about 1.4 uA. Accordingly, a 2000 mAh battery may be configured to power the magnetic release assembly 12 for duration well beyond the life of the battery. (~30 years).

Figure 9:
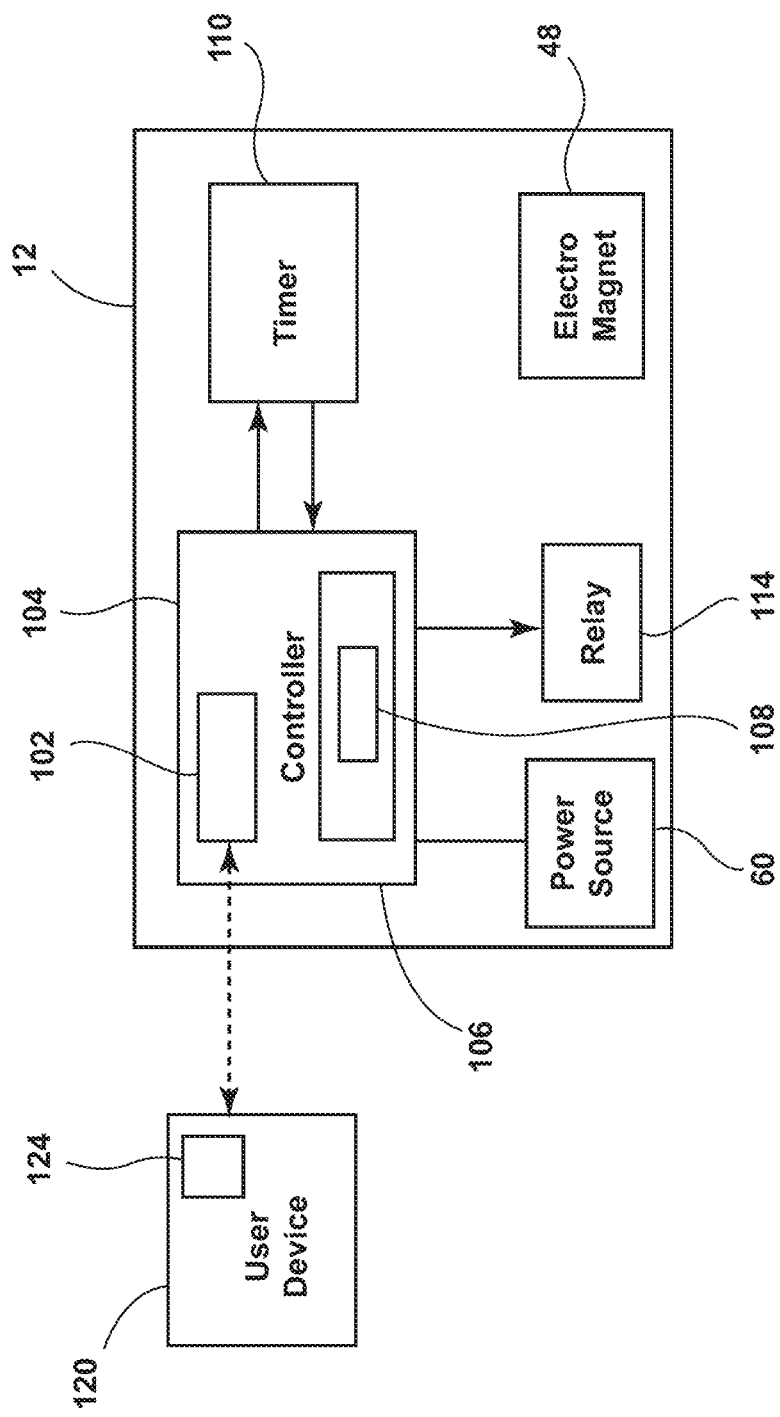
FIG. 9 is a block diagram of a magnetic release assembly, according to various examples.

Referring now to FIG. 9, the microcontroller 104 may use the Bluetooth™ integrated circuit 102 to communicate with the application (app) 124 on a user device 120 when the microcontroller 104 is powered by the power source 60. The microcontroller 104 includes an onboard process 106 including memory 108. The user may use the app 124 to select a release time and date. The app 124 will then calculate a time interval from the current time and date to the selected release time and date in milliseconds. The app 124 communicates the release time to the microcontroller 104 via Bluetooth™ technology. The app also stores current GPS data on the user device 124.

Upon receipt of the time data from the app 124, the processor 106 of the microcontroller 104 is configured to then provide the current time, the release time, and/or the time interval in milliseconds to the timer board 110. Once the microcontroller 104 has provided the timer board 110 with the time interval, the microcontroller 104 is configured to enter into a deep sleep state that places the magnetic release assembly 12 into a low-power mode.

The timer board 110 is configured to count until the time interval has elapsed and the selected release time is reached. When the release time is reached, the timer board 110 is configured to issue an alarm to the microcontroller 104. The microcontroller 104 is configured to move from the deep sleep state to an active state when the alarm is received from the timer board 110. The microcontroller 104 then sends a signal to the second relay 114. The second relay 114 feeds 12V to the PEM 48 to energize the PEM 48, causing the PEM 48 to release the magnetic disk 52 and, subsequently, release the float 14 (see FIGS. 1 and 2). In various examples, the voltage for release of the float 14 is maintained for a set time (e.g., about one second). When the float 14 is released, the float 14 is configured to buoy to the surface of the water for retrieval (see FIG. 2). The magnetic release assembly 12 may then continue to send out signals via the microcontroller 104 and Bluetooth™ integrated circuit 102 until the magnetic release assembly 12 is again connected via the app 124. At this point, the user may send a new release time, turn the system off by placing a magnet on the reed switch position, and/or charge the batteries of the system.

Figures 10A, 10B:
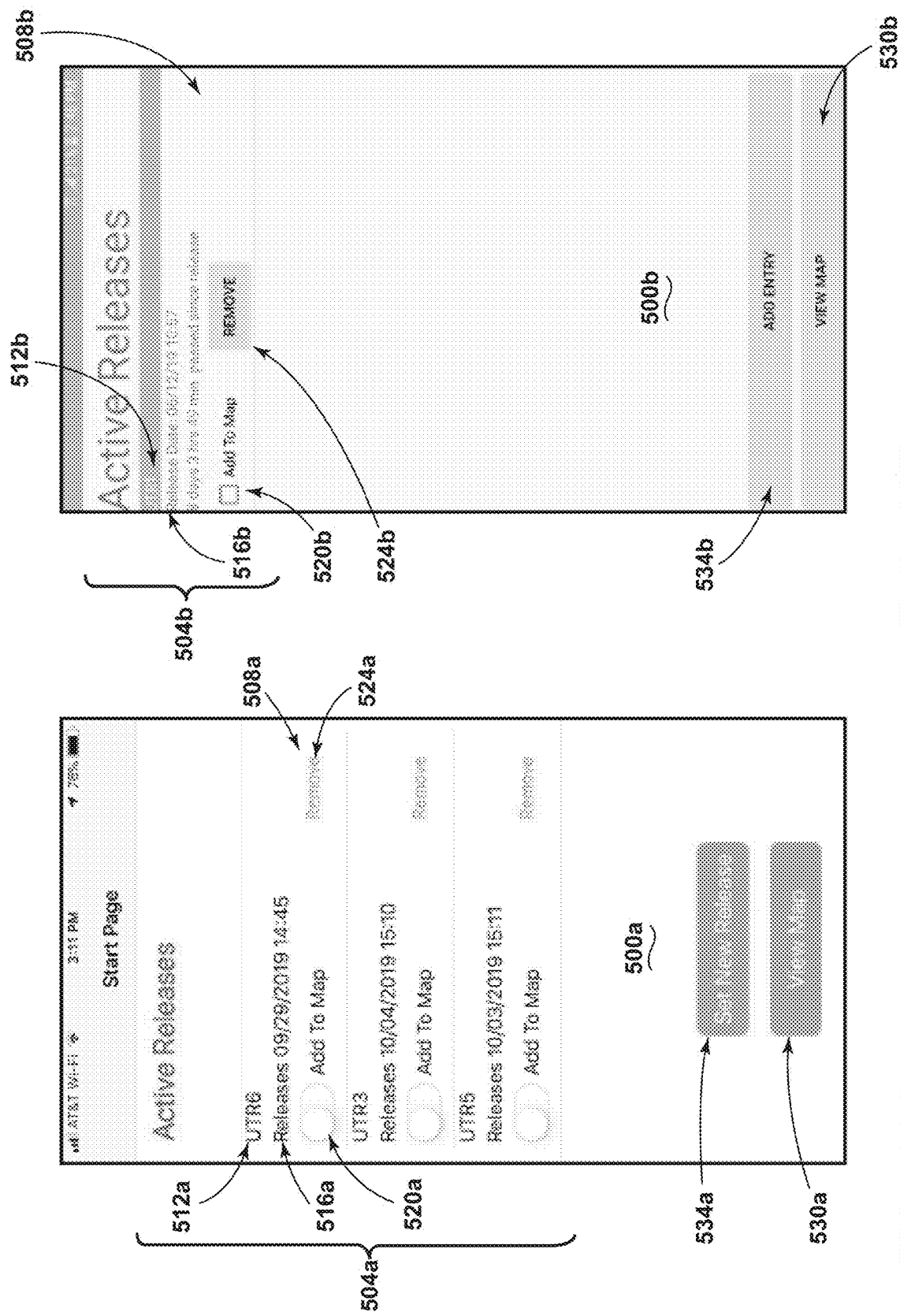
FIG. 10A illustrates a main page of an application for use with a magnetic release assembly on a first platform, according to various examples.
FIG. 10B illustrates a main page of an application for use with a magnetic release assembly on a second platform, according to various examples.

Referring now to FIGS. 10A-16B, two comparable sets of screen shots depicting examples of the use of application context in a release app domain are illustrated. The first set of screen shots is indicated by FIGS. 10A and 10B and show exemplary main pages 500a, 500b of a software component, namely a mobile application ("app") 124, which resides in a user device 122 (see FIG. 9). FIG. 10A illustrates a main page 500a for one such user device platform, and FIG. 10B illustrates a main page 500b for another user device platform. The overall operation of the application 124 for each user device platform may be configured to be the same or substantially similar across the platforms. It will be understood that components that are the same or substantially similar have the same or similar reference numerals. It will also be understood that the depictions of these components are exemplary only and that the visual appearance of the pages of the application may be modified without departing from the scope of the present disclosure.

When the app 124 is launched, the user device 122 displays the main page 500a, 500b that shows a list 504a, 504b of entries 508a, 508b. Each entry 508a, 508b is linked to a respective deployed releasable assembly 10 (also referred to herein as an underwater release assembly or "UMR") and includes a unique identifier 512a, 512b of the respective UMR 10, a release time 516a, 516b of the respective UMR 10, and a selection button 520a, 520b. The selection box 520a, 520b is configured to allow a user to selective to add the respective UMR 10 to a map 528a, 528b or other graphical representation option (see FIGS. 11A and 11B). The selection box 520a, 520b may be a checkbox, a toggle, or any other visual selection option without departing from the scope of the present disclosure. The app 124 may also be configured to store other pertinent information related to each UMR 10 and associate the information with the respective entry 508a, 508b. From the main page 500a, 500b, the app 124 may also allow the user to set one or more alarms for each launched UMR 10.

Figure 11B:
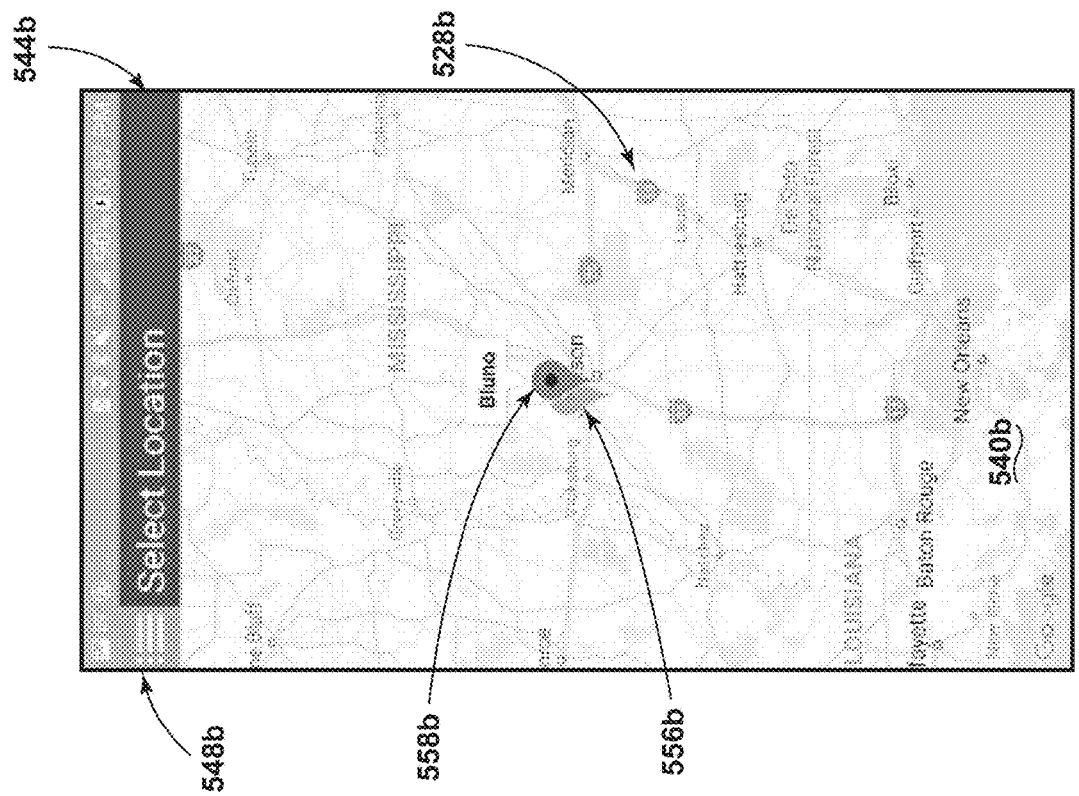
FIG. 11B illustrates a graphical display page of the application of FIG. 10B, according to various examples.
Figure 11A:
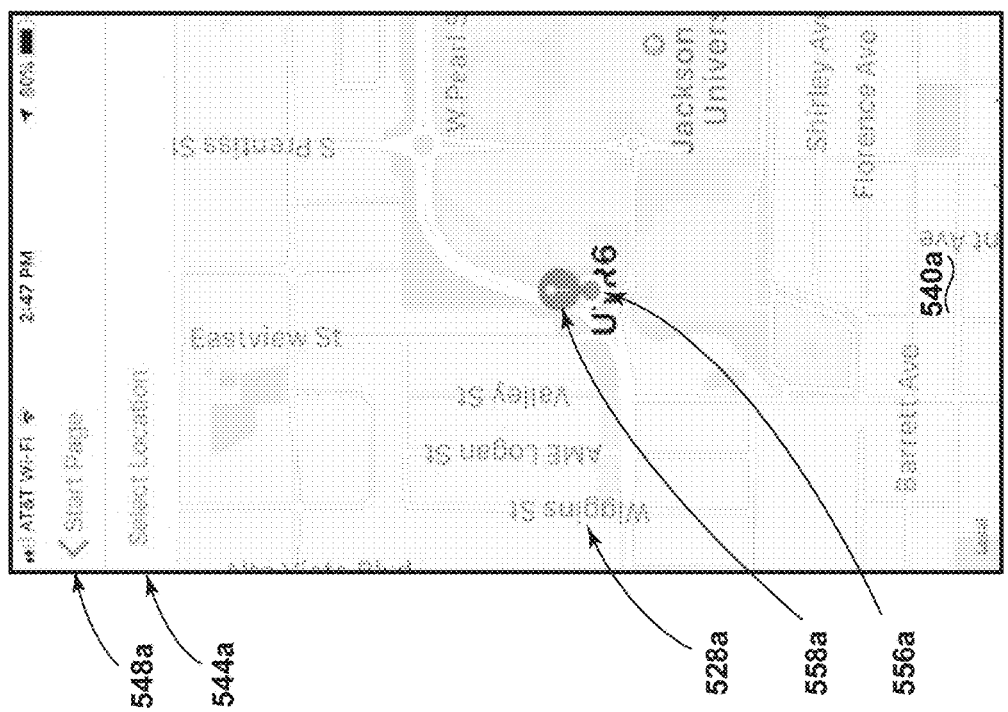
FIG. 11A illustrates a graphical display page of the application of FIG. 10A, according to various examples.
Figure 12B:
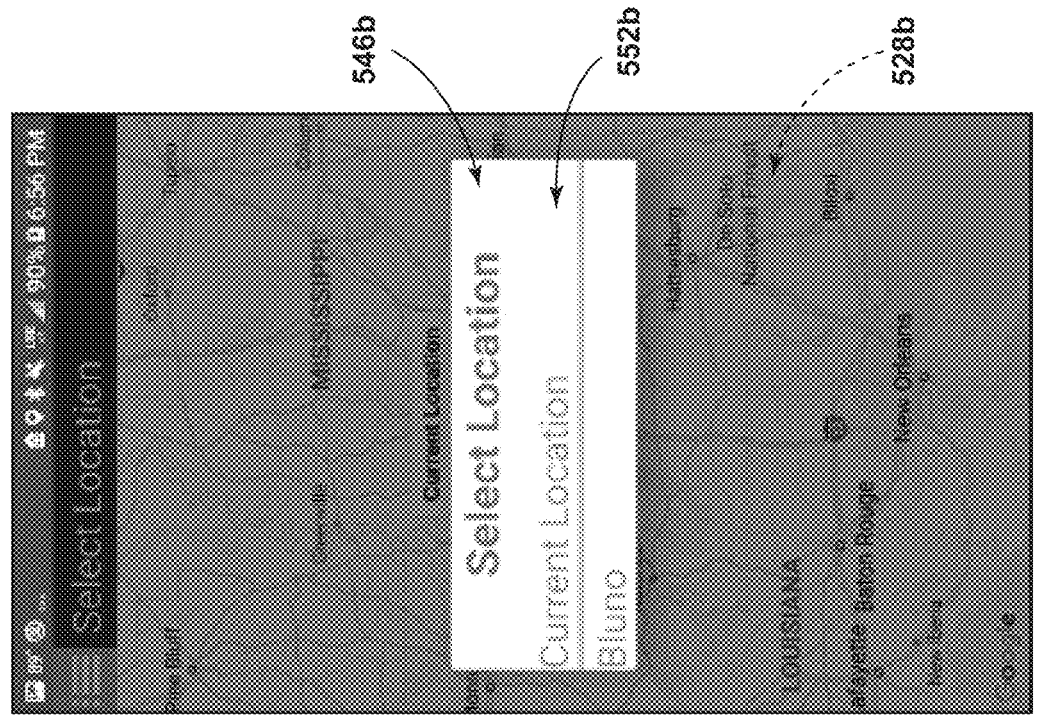
FIG. 12B illustrates the graphical display page of FIG. 11B including a location list, according to various examples.
Figure 12A:
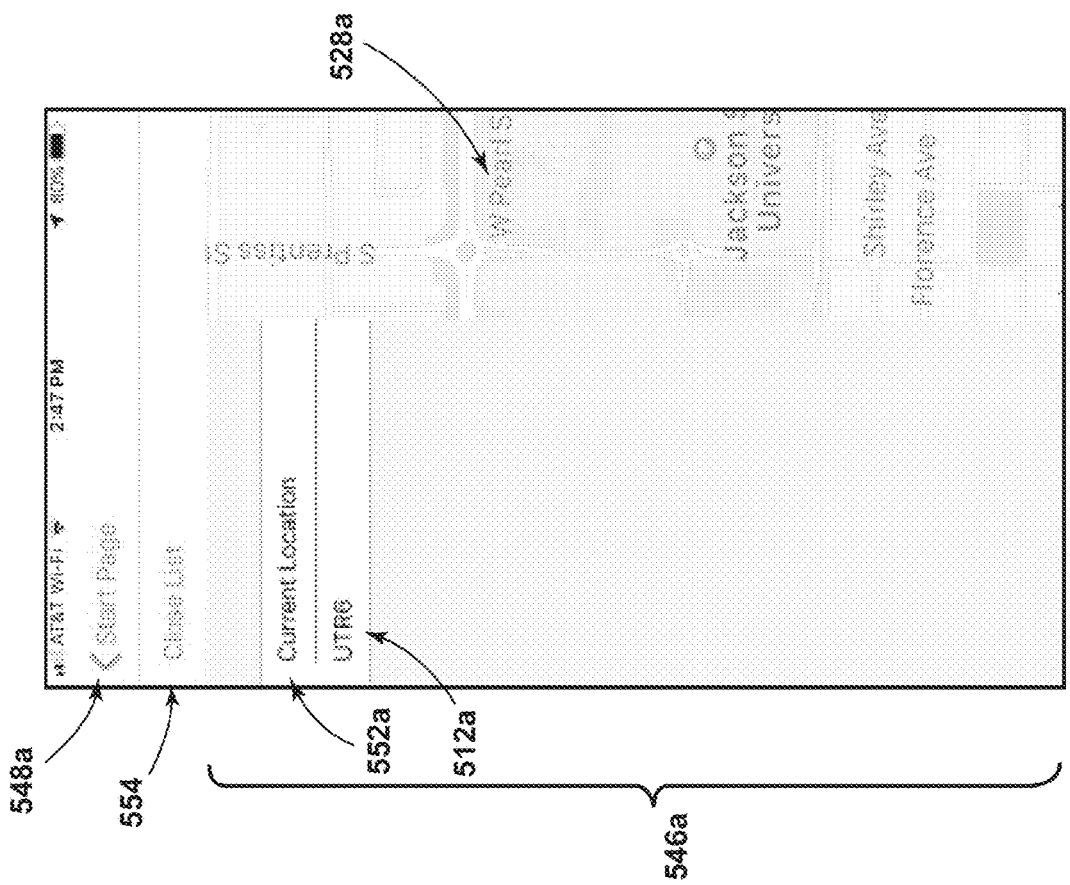
FIG. 12A illustrates the graphical display page of FIG. 11A including a location list, according to various examples.

The main page 500a, 500b further includes a first button 530a, 530b configured to toggle to a graphical display page 540a, 540b. Using the graphical display page 540a, 540b, as shown in FIGS. 11A and 11B, the user can see any of the user's launched UMRs 10 on a map 528a, 528b (e.g., a Google map) when the selection box 520a, 520b is selected. The graphical display page 540a, 540b further includes a location selection control bar 544a, 544b, which is configured to launch a drop-down menu 546a, 546b, as best shown in FIGS. 12A and 12B.

Referring now to FIGS. 11A-12B, from the drop-down menu 546a, 546b the user may select to view the location of a specific UMR 10 identified by its unique identifier 512a, 512b and/or may select to view the user's current location via a current location selection 552a, 522b. The user's current location may be identified by a location pin 556a, 556b positioned on the map 528a, 528b (see FIGS. 11A and 11B) and is determined by the GPS coordinates of the user device 120. Each UMR 10 location may be identified by a UMR pin 558a, 558b positioned on the map 528a, 528b. The UMR 10 locations are determined by GPS coordinates stored in the app 124 when the respective UMR 10 is initially launched, as described in more detail elsewhere herein. In various examples, the drop-down menu 546a, 546b may include a "close" button 554. The graphical display page 540a, 540b may also include a menu button 548a, 548b for returning to the main page 500a, 500b.

Figure 13B:
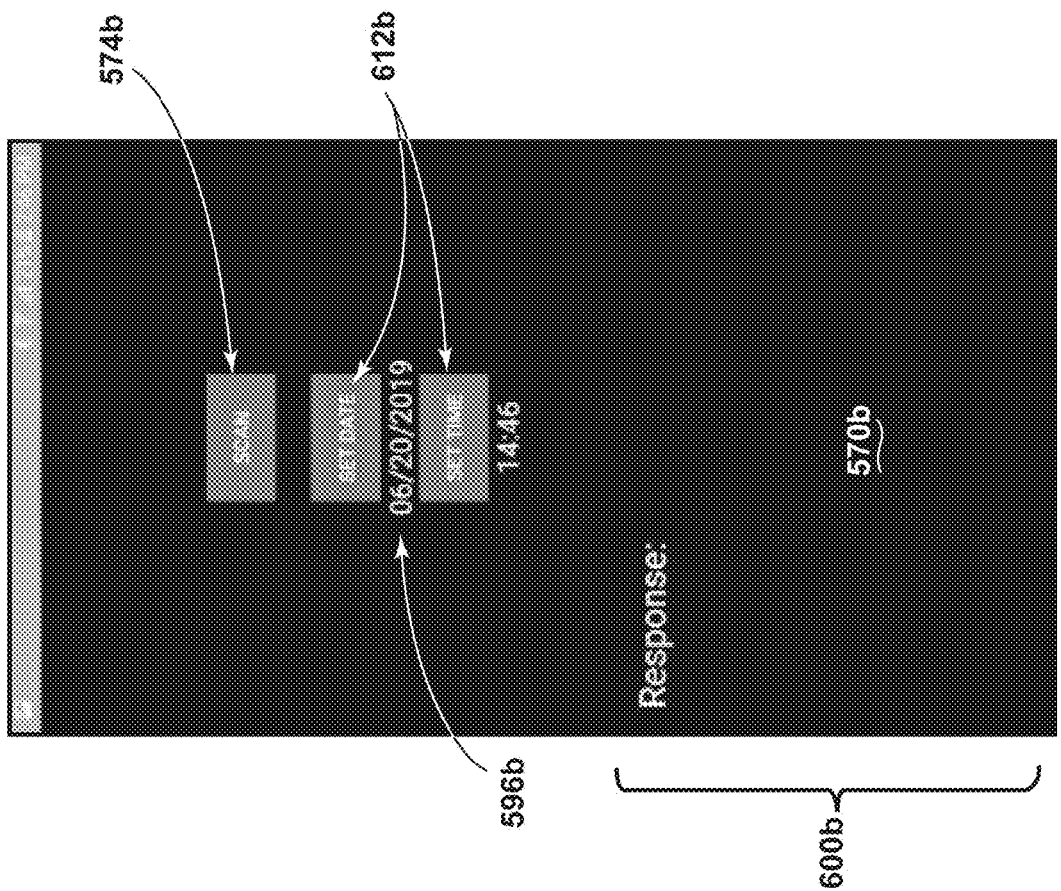
FIG. 13B illustrates a launch page of the application of FIG. 10B, according to various examples.
Figure 13A:
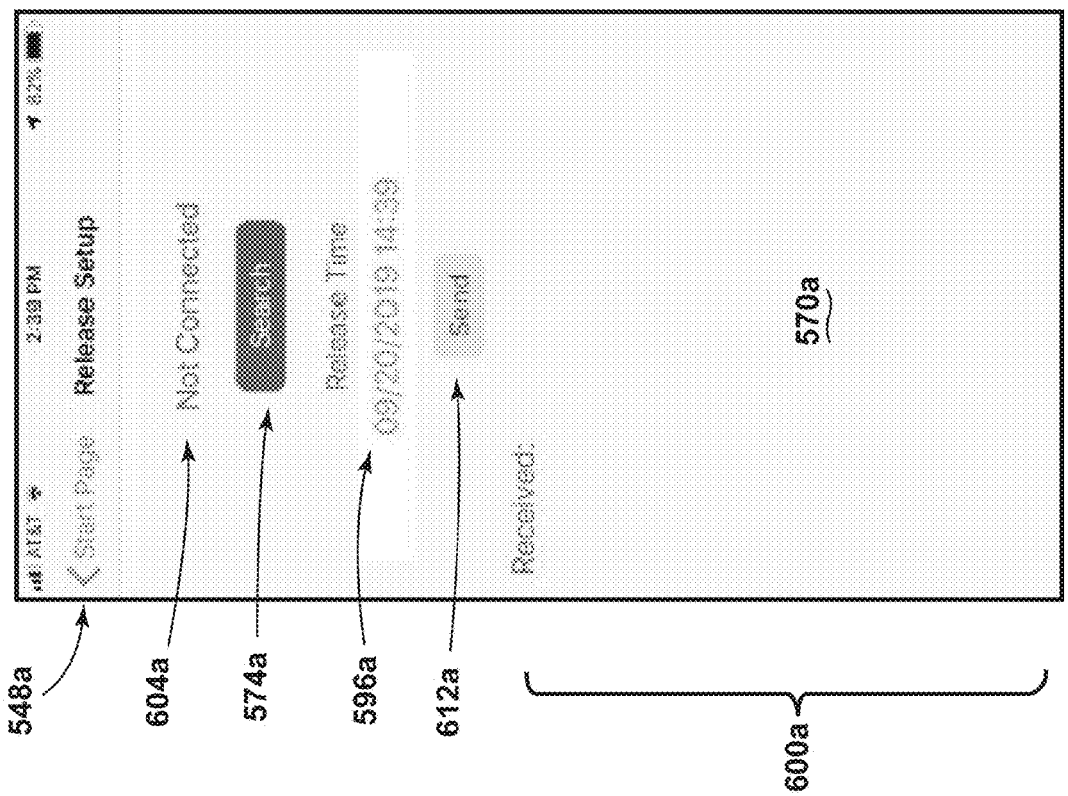
FIG. 13A illustrates a launch page of the application of FIG. 10A, according to various examples.
Figures 14A, 14B:
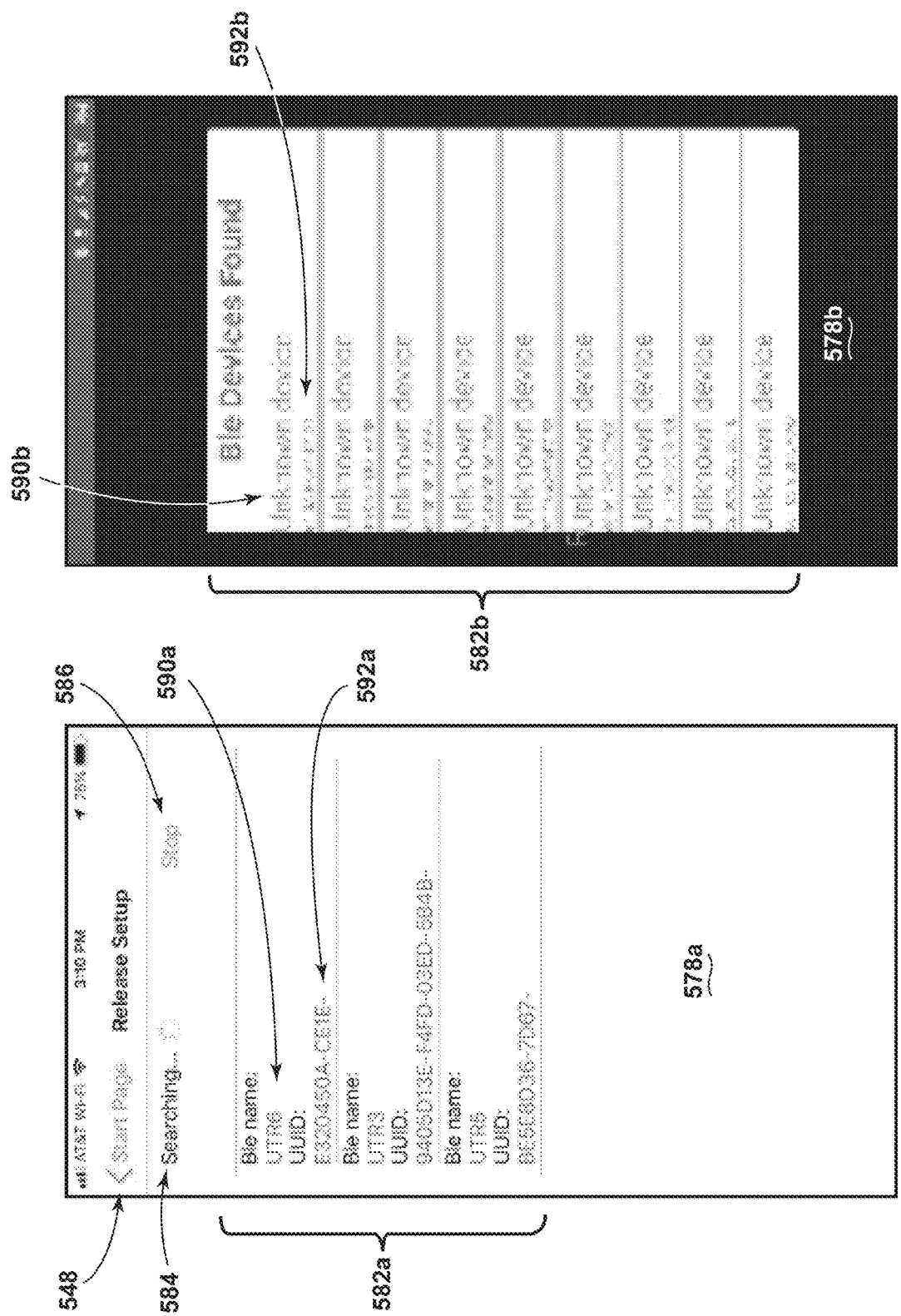
FIG. 14A illustrates a list page of the application of FIG. 10A, according to various examples.
FIG. 14B illustrates a list page of the application of FIG. 10B, according to various examples.
Figure 15:
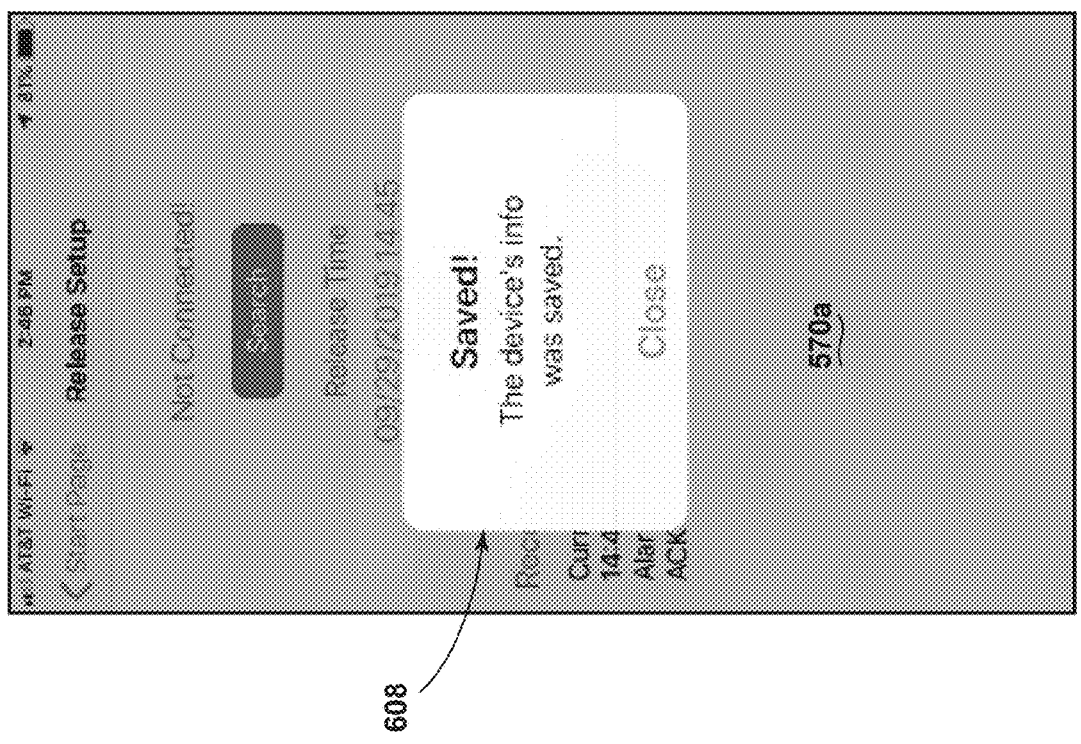
FIG. 15 illustrates a confirmation notification of the application of FIG. 10A, according to various examples.
Figure 16B:
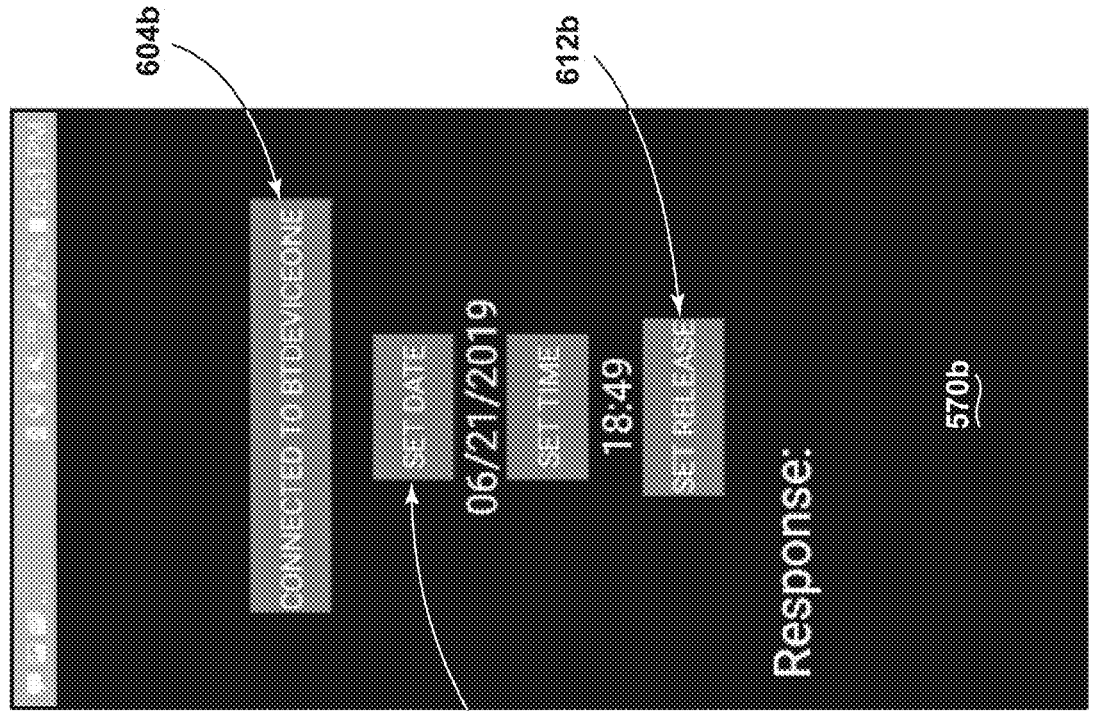
FIG. 16B illustrates a launch page of the application of FIG. 10B, according to various examples.
Figure 16A:
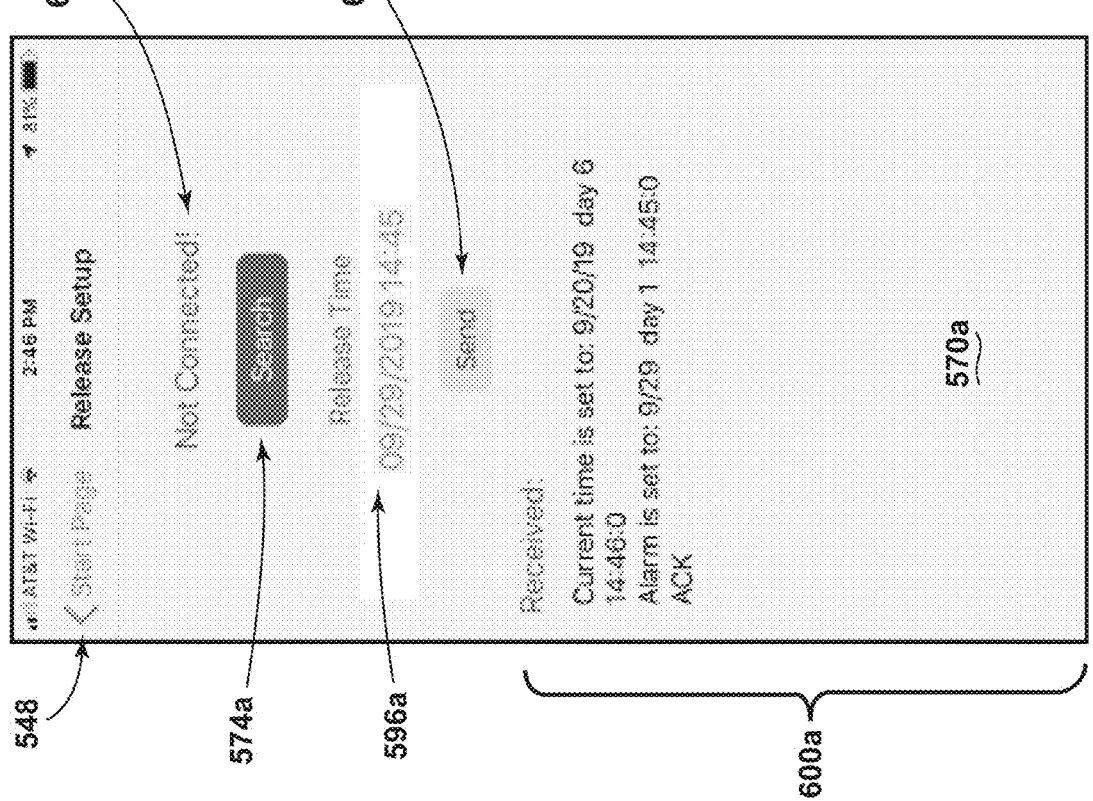
FIG. 16A illustrates a launch page of the application of FIG. 10A, according to various examples.
Figure 17:
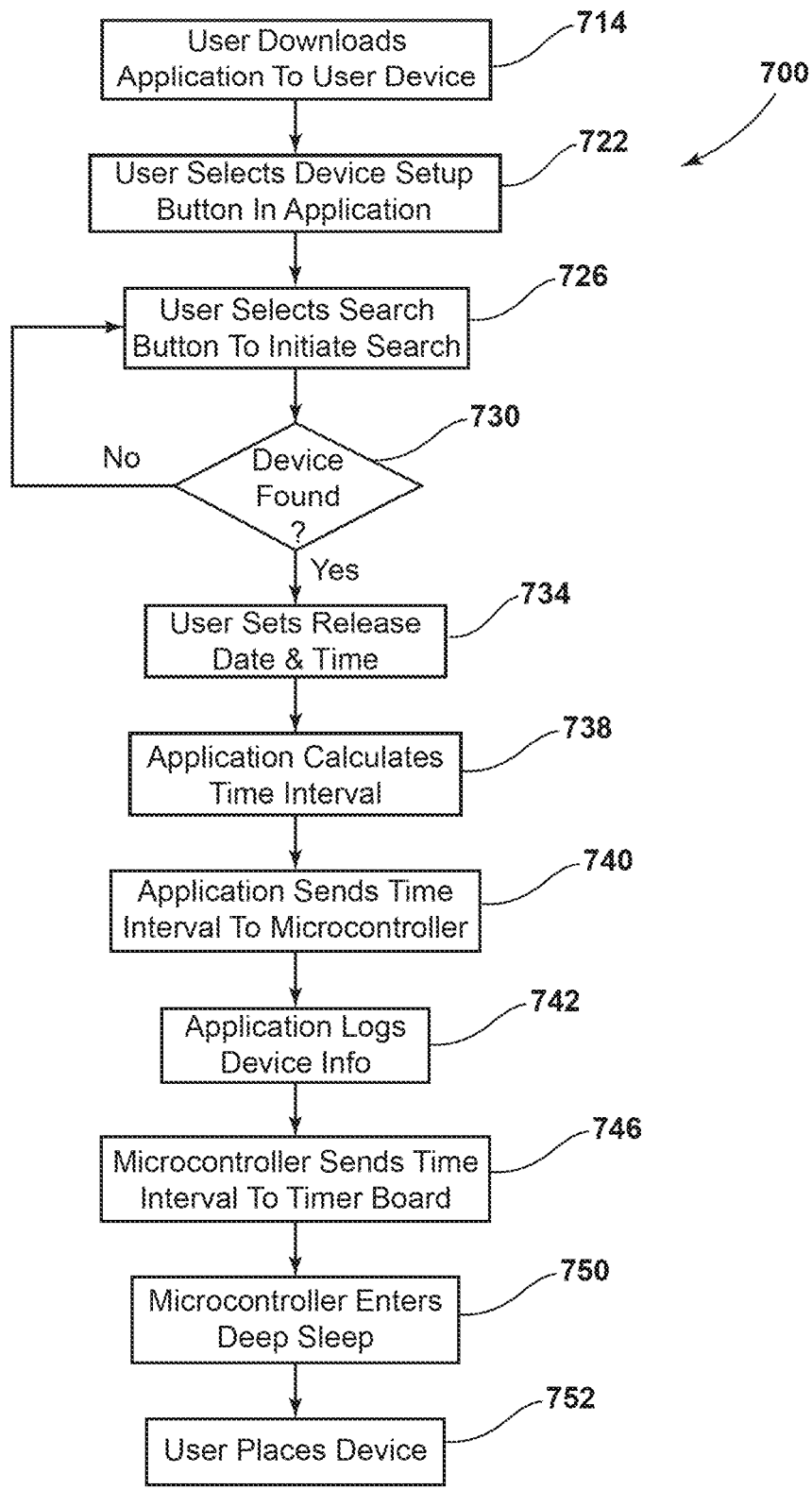
FIG. 17 is a flow diagram of a method of programming a release assembly, according to various examples.

Referring again to FIGS. 10A and 10B, a second button 534a, 534b is configured to toggle to a launch page 570a, 570b (FIGS. 13A and 13B) from which the user can launch a new UMR 10. As best shown in FIGS. 13A and 13B, the launch page 570a, 570b includes a search button 574a, 574b. When the search button 574a, 574b is selected, a list page 578a, 578b of available UMRs 10 is displayed, as shown in FIGS. 14A and 14B. In other words, when the search button 574a, 574b displays a list page 578a, 578b of UMRs 10 that are producing Bluetooth™ signals within a communicable radius. The user may then select one of the available UMRs 10 from the list page 578a, 578b. If a connection is not made, the user will have to search again using the search button 574a, 574b, until a connection is established. If a connection is made, an acknowledgement may be received. The user may then be redirected to the launch page 570a, 570b where the unique identifier 590a, 590b of the selected UMR 10 may be displayed (see FIGS. 16A and 16B).

As shown in FIGS. 13A and 13B, the launch page 570a, 570b further includes a release time entry field 596a, 596b. The release time entry field 596a may be a single field for entering both date and time (see FIG. 13A), of the release time entry field 596b may have multiple fields for entering date and time separately (see FIG. 13B). It will be understood that the date and time may be selected using any date and time selection including direct input, scrolling menus, calendars, clocks, etc. without departing from the scope of the present disclosure.

The launch page 570a, 570b may further include a response section 600a, 600b positioned below the release time entry field 596a, 596b. The response section 600a, 600b may be used to display information regarding the selected UMR 10 and the selected release date and time. In various examples, one or more release buttons 612a, 612b may also displayed on the launch page 570a, 570b. Once the release time entry field 596a, 596b has been filled, the user may select the release button 612a, 612b to send the information to the UMR 10. The user may also be prompted to program alarms to alert the user prior to the selected release date and time.

Referring now to FIGS. 9-16B, the release button 612a, 612b is configured to transmit the timing data to the onboard processor 106 of the microcontroller 104 via the wireless connection with the Bluetooth™ integrated circuit 102. The release button 612a, 612b may also be configured to initiate storage of the current GPS coordinates for the selected UMR 10 within the application 124 and/or the user device 120. GPS coordinates may be generated from the user device 120. When an acknowledgement is received from the on-board processor 106, a confirmation screen may be shown (see FIG. 15) and the user may be redirected to the main page 500a, 500b. At this point the UMR 10 will disappear from the active Bluetooth™ device list 582a, 582b, as power is severed to all electronic components except for the timer board 110. Also, the device identifier 512a, 512b and its GPS coordinates are added to the deployed devices list 546a, 546b (see FIGS. 12A and 12B). In various examples, confirmation pages and/or popups may be used at any selection stage of the app 124 without departing from the scope of the present disclosure.

Referring now to FIGS. 1-17, a method 700 of programming a releasable float assembly 10 is described prior to submerging the releasable float assembly 10. The releasable float assembly 10 includes the magnetic release assembly 12 operably coupled with the float 14. The magnetic release assembly 12 may be coupled with or integrally formed with an apparatus 20 (e.g., a trap cage, a container, etc.). The float 14 may be coupled with the apparatus 20 and is configured to indicate the location of the apparatus 20 when the float 14 is released. The magnetic release assembly 12 include electrical components 44. The electrical components 44 are selected to include a power source 60, a microcontroller 104 having a Bluetooth™ integrated circuit 102, a timer board 110, and a permanent electromagnet (PEM) 48.

An application 124 is downloaded to a user device 120 that is communicable with Bluetooth™ technology (step 714). The application 124 includes a main page 500a, 500b configured to appear when the user selects the application 124. The user then selects a button 534a, 534b to set up a new UMR release time (step 722). The application 124 is configured to display a launch page 570a, 570b in response to selection of the button 534a, 534b. The user then selects a search button 574a, 574b to search for Bluetooth™ enabled devices such as the UMR 10 within a radius (step 726). If a device 10 is not located, the user must select the search button again 574a, 574b until a device 10 is located (step 730).

Once a device is located, the user can then set a release time and date (step 734). The release time and date may be selected using input fields 596a, 596b. The application 124 is configured to calculate a time interval between the current date and time and the release date and time (step 738). Once the release time and date are set, the user may select a launch button 612a, 612b to send the time interval and data to the microcontroller 104 of the magnetic release assembly 12 (step 740). The application 124 may then be configured to log the identifier 512a, 512b of the selected device 10 and the GPS coordinates (step 742) within the application 124 and/or user device 120.

When the release time data is provided to the microcontroller 104, the microcontroller 104 provides the time interval to the timer board 110 (step 746) and enters a deep sleep state (step 750). In another step 752, the user may then place (e.g., submerge) the device 10. When the time interval has elapsed, the timer board 110 is configured to awaken the microcontroller 110 to provide power to the PEM 48. Providing power to the PEM 48 allows the float 14 to be released.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A releasable float assembly comprising:
   a float coupled with an apparatus to be submerged in water, wherein the float is configured to be buoyant;
   a magnetic release assembly coupled with the apparatus, the magnetic release assembly including:
   a permanent electromagnet configured to be selectively engaged with the float;
   a microcontroller operably coupled with the permanent electromagnet;
   a timer board in communication with the microcontroller; and
   a power source configured to selectively power the microcontroller, the timer board, and the permanent electromagnet.

2. The releasable float assembly of claim 1, wherein the float includes a disc configured to be selective engaged with the permanent electromagnet.

3. The releasable float assembly of claim 1, further including an application stored on a user device, wherein the application is configured to be in wireless communication with a processor of the microcontroller.

4. The releasable float assembly of claim 3, wherein the application is configured to calculate a time interval and communicate the time interval to the microcontroller.

5. The releasable float assembly of claim 4, wherein the microcontroller is configured to communicate the time interval to the timer board.

6. The releasable float assembly of claim 5, wherein the timer board is configured to provide an alarm to the microcontroller that the time interval has elapsed.

7. The releasable float assembly of claim 6, wherein the magnetic release assembly includes a relay positioned between the permanent electromagnet and the power source, and further wherein the microcontroller is configured to close the relay to provide power to the permanent electromagnet in response to the alarm.

8. The releasable float assembly of claim 1, wherein the power source includes:
   a charging board operably coupled with one or more batteries;
   a diode electronically coupled with the charging board;
   a relay electronically coupled with at least one of the diode and the charging board; and
   a charging pole operably coupled with the charging board, the diode, and the relay, wherein the charging pole moves the relay to provide power to the charging board when power is supplied to the charging pole.

9. The releasable float assembly of claim 8, wherein the power source includes a converter electronically coupled with the microcontroller and the one or more batteries.

* * * * *